(12) United States Patent
Melink

(10) Patent No.: US 11,680,736 B2
(45) Date of Patent: Jun. 20, 2023

(54) HEAT PUMP SYSTEM UTILIZING DOMESTIC WATER

(71) Applicant: Melink Solar & Geo, Inc., Milford, OH (US)

(72) Inventor: Stephen K. Melink, Cincinnati, OH (US)

(73) Assignee: Melink Solar & Geo, Inc., Milford, OH (US)

( * ) Notice: Subject to any disclaimer, the term of this patent is extended or adjusted under 35 U.S.C. 154(b) by 389 days.

(21) Appl. No.: 17/093,813

(22) Filed: Nov. 10, 2020

(65) Prior Publication Data

US 2021/0148614 A1    May 20, 2021

Related U.S. Application Data

(60) Provisional application No. 62/937,341, filed on Nov. 19, 2019.

(51) Int. Cl.
*F25B 30/06* (2006.01)
*F25B 13/00* (2006.01)

(52) U.S. Cl.
CPC ............ *F25B 30/06* (2013.01); *F25B 13/00* (2013.01); *F25B 2313/003* (2013.01); *F25B 2313/02334* (2013.01)

(58) Field of Classification Search
CPC ...... F25B 2313/02334; F25B 2313/003; F25B 30/06; F25B 13/00
See application file for complete search history.

(56) References Cited

U.S. PATENT DOCUMENTS

| | | |
|---|---|---|
| 4,192,146 A | 3/1980 | Crede |
| 9,151,541 B2 | 10/2015 | Jagusztyn |
| 2011/0314856 A1 | 12/2011 | Willgohs |
| 2012/0279681 A1* | 11/2012 | Vaughan ................. F25B 30/06 165/96 |
| 2012/0318475 A1 | 12/2012 | Glover |
| 2018/0120011 A1 | 5/2018 | Goldman |
| 2018/0187931 A1 | 7/2018 | Feria |
| 2019/0257540 A1* | 8/2019 | Rosen ..................... F24F 11/83 |
| 2020/0049381 A1* | 2/2020 | Thielmann ............. F24T 10/40 |

* cited by examiner

*Primary Examiner* — Larry L Furdge
(74) *Attorney, Agent, or Firm* — Taft Stettinius & Hollister LLP

(57) ABSTRACT

An exemplary system is for a facility including a first heating/cooling zone and a water delivery system configured to deliver domestic water to a point of water use. The system generally includes a facility loop having a facility loop refrigerant flowing therethrough, a first zone heat pump configured to transfer thermal energy between the facility loop refrigerant and the first heating/cooling zone, and a first water-source heat pump configured to transfer thermal energy between domestic water upstream of the point of water use and the facility loop refrigerant.

8 Claims, 8 Drawing Sheets

HEAT PUMP SYSTEM UTILIZING DOMESTIC WATER

CROSS-REFERENCE TO RELATED APPLICATIONS

The present application claims the benefit of US Provisional Patent Application No. 62/937,341, filed Nov. 19, 2019, the contents of which are incorporated by reference in their entirety.

TECHNICAL FIELD

The present disclosure generally relates to heat pump systems, and more particularly but not exclusively relates to heat pump systems utilizing domestic water as a heat source/sink.

BACKGROUND

The concept of using municipal water with heat pumps to heat and cool buildings has been around for some time, but rarely implemented due to the high cost and waste of the water for this purpose. The incremental water cost might be acceptable in some markets, but the incremental sewer cost is typically prohibitive. A variation of this concept eliminates the high water use by installing a heat exchanger between the underground water line and the building heat pump water loop. The purpose is to let the underground water line absorb/reject heat with the building and not worry about the minimal temperature effect on the domestic water serving buildings downstream. However, code and/or zoning issues and the additional infrastructure cost have limited the commercial success of these systems. More recently, a solution has been developed to tap into the downstream waste of a building to help heat and cool a heat pump water loop. Specifically, a heat exchanger taps into the sewer water before it leaves a facility, and this heat energy is used to heat the building loop. However, the first cost and operating cost of moving waste water with solids (human waste, paper, plastic, etc.) through a heat exchanger limits the system's economic viability and adoption. For these reasons among others, there remains a need for further improvements in this technological field.

SUMMARY

An exemplary system is for a facility including a first heating/cooling zone and a water delivery system configured to deliver domestic water to a point of water use. The system generally includes a facility loop having a facility loop refrigerant flowing therethrough, a first zone heat pump configured to transfer thermal energy between the facility loop refrigerant and the first heating/cooling zone, and a first water-source heat pump configured to transfer thermal energy between domestic water upstream of the point of water use and the facility loop refrigerant. Further embodiments, forms, features, and aspects of the present application shall become apparent from the description and figures provided herewith.

DETAILED DESCRIPTION OF ILLUSTRATIVE EMBODIMENTS

Figure 1:
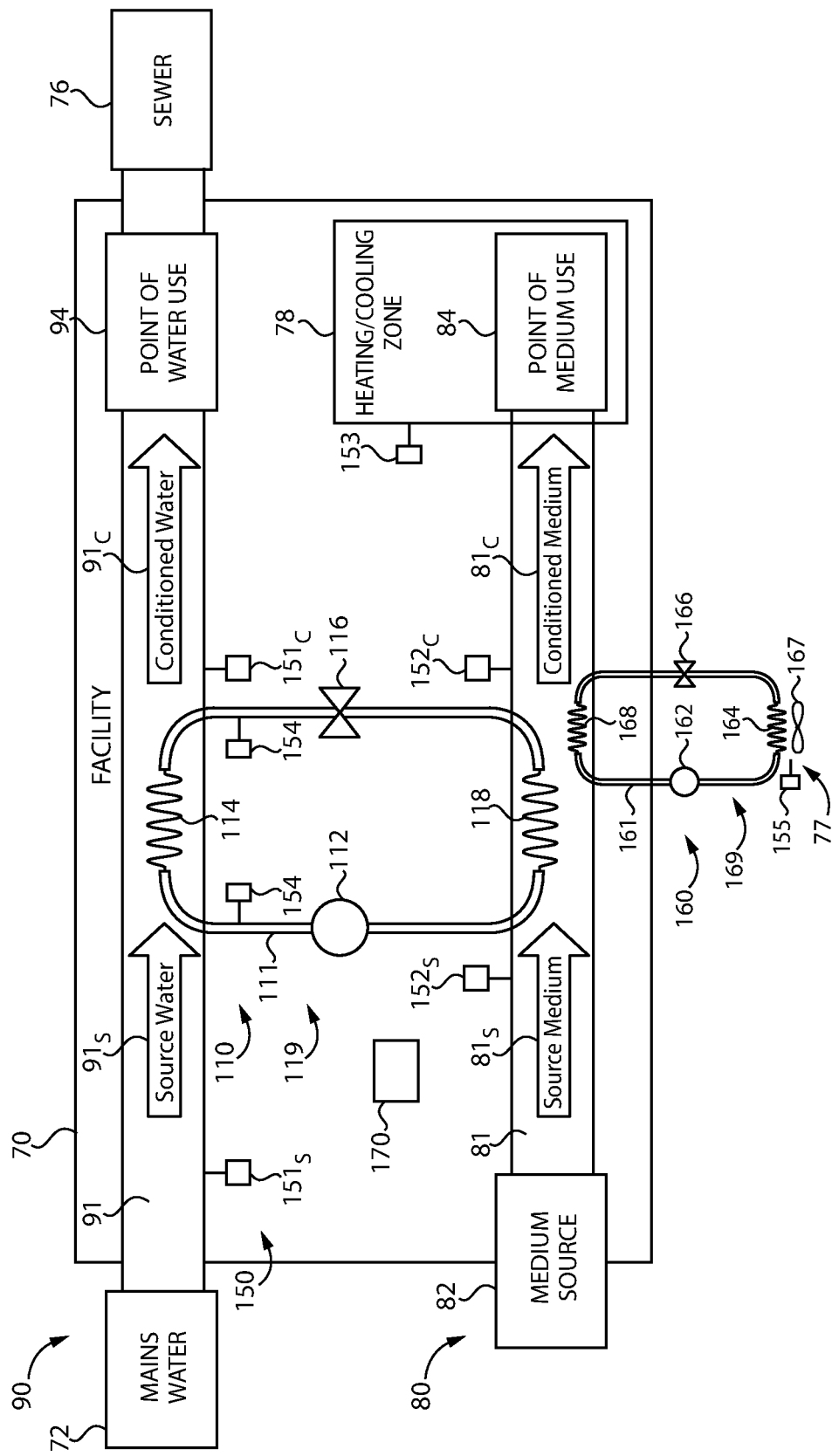
FIG. 1 is a schematic diagram of a system according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a facility 70 including an indoor medium stream 80, a water stream 90, and a heat pump system 100 according to certain embodiments. The facility 70 has a mains water connection 72, and directs water 91 along the water stream 90 from the mains water connection 72 to a point of water use 94. In certain embodiments, the point of water use 94 may be a point at which the water 91 is utilized by an end user, such as a faucet, a shower, a toilet, a washing machine, a dishwasher, an indoor or outdoor sprinkler system, or another point at which the water 91 is utilized by the end user. In certain embodiments, the point of use 94 may be an intermediate point of use, such as a water heating tank. The facility 70 may further have a sewer connection 76, and water 91 may be directed from the point of water use 94 to the sewer connection 76.

The facility 70 has at least one heating/cooling zone 78 that is heated and/or cooled by the system 100. More particularly, the system 100 transfers thermal energy between the water 91 and an indoor medium 81, and the indoor medium 81 is utilized to heat and/or cool the heating/cooling zone 78 at a point of indoor medium use 84. In certain embodiments, the indoor medium 81 is provided as air that is pumped into the heating/cooling zone 78. In certain embodiments, the indoor medium 81 is provided as a liquid (e.g., water) that circulates through a radiator and/or piping installed to the floors, walls, and/or ceiling of the heating/cooling zone 78 for radiant heating/cooling of the heating/cooling zone 78. In certain embodiments, the indoor medium 81 is provided as air of the heating/cooling zone 78 that is heated/cooled by such radiant heating/cooling. In certain embodiments, the indoor medium 81 may be an intermediate medium such as a refrigerant that is in indirect thermal communication with the heating/cooling zone 78.

The indoor medium stream 80 may proceed from a medium source 82 to the point of medium use 84, which may be provided at the heating/cooling zone 78. As described herein, the heat pump system 100 conditions the indoor medium 81 at a heat exchanger 118 such that source indoor medium 81s upstream of the heat exchanger 118 is converted to conditioned indoor medium 81c downstream of the heat exchanger 118, and the conditioned indoor medium 81c is directed to the point of indoor medium use 84. In certain embodiments, the indoor medium source 82 may be an outdoor source, while in other embodiments, the indoor medium source 82 may be an indoor source. For example, in embodiments in which the indoor medium 81 is provided as air, the air may be directed from outdoors to mix with indoor return air. In certain embodiments, the indoor medium stream 80 may form a loop. For example, the source indoor medium 81s may be directed from the heating/cooling zone 78 into the system 100 via a first line, and may be returned to the point of medium use 84 as conditioned medium 81c via a second line. As noted above, the indoor medium 81 may be provided as air or as a liquid that is used for radiant heating/cooling of the heating/cooling zone 78.

The heat pump system 100 generally includes a water-source heat pump 110 having a refrigerant 111 flowing therethrough, and may further include one or more of a sensor array 150, an additional heat pump 160, and/or a control system 170. As described herein, the heat pump system 100 operates to heat or cool the indoor medium 81 such that the indoor medium 81 is conditioned for use at the point of indoor medium use 84, such as a heating/cooling zone 78 of the facility 70. Operation of the heat pump 110 serves to transfer thermal energy to or from the water 91 upstream of the point of water use 94 such that the water 91 is heated or chilled prior to use at the point of water use 94. Operation of the heat pump 110 also serves to transfer thermal energy to or from the indoor medium 81 upstream of the point of indoor medium use 84 such that the indoor medium 81 is heated or chilled prior to use at the point of indoor medium use 84.

The water-source heat pump 110 generally includes a compressor 112 that compresses the refrigerant 111, a first heat exchanger 114 that transfers thermal energy between the refrigerant 111 and the water 91 upstream of the point of use 94, an expander 116 that expands the refrigerant 111, and a second heat exchanger 118 that transfers thermal energy between the refrigerant 111 and the indoor medium 81. The compressor 112, first heat exchanger 114, expander 116, and second heat exchanger 118 are connected by piping such that a vapor-compression loop 119 is formed by the heat pump 110. In certain embodiments, the refrigerant 111 may comprise water. In certain embodiments, a water-comprised refrigerant 111 may further include an antifreeze agent such as glycol. In certain forms, the first heat exchanger 114 may be provided as a double-walled heat exchanger to aid in isolating the potable domestic water 91 from the refrigerant 111. The heat pump 110 may be reversible such that the heat pump 110 is operable in a medium-cooling mode and a medium-heating mode. While not specifically illustrated in FIG. 1, it is to be appreciated that the heat exchanger 114 may be positioned in a holding tank through which the domestic water 91 flows.

During operation of the heat pump 110, thermal energy is transferred between the refrigerant 111 and the water 91 by the first heat exchanger 114, and thermal energy is transferred between the refrigerant 111 and the indoor medium 81 by the second heat exchanger 118. As such, the heat exchangers 114, 118 may be considered to define boundaries between source media upstream of the heat exchangers 114, 118 and conditioned media downstream of the heat exchangers 114, 118. Accordingly, indoor medium 81 upstream of the second heat exchanger 118 may be referred to herein as the source indoor medium 81s, and indoor medium 81 downstream of the second heat exchanger 118 may be referred to herein as conditioned indoor medium 81c. Similarly, water 91 upstream of the first heat exchanger 114 may be referred to herein as the source water 91s, and water 91 downstream of the first heat exchanger 114 may be referred to herein as conditioned water 91c.

In the medium-cooling mode, the heat pump 110 serves to transfer thermal energy from the medium 81 to the water 91, thereby cooling the medium 81 while heating the water 91. In the medium-cooling mode, the refrigerant 111 flows from the compressor 112 to the first heat exchanger 114, which acts as the condenser for the loop 119. Accordingly, the refrigerant 111 in the first heat exchanger 114 rejects heat to the water 91, thereby heating the water 91. Thus, in the medium-cooling mode, the conditioned water 91c downstream of the first heat exchanger 114 is warmer than the source water 91s upstream of the first heat exchanger 114. The refrigerant 111 then flows through the expander 116 to the second heat exchanger 118, which acts as the evaporator for the loop 119. Accordingly, the refrigerant 111 in the second heat exchanger 118 accepts heat from the medium 81, thereby cooling the medium 81. Thus, in the medium-cooling mode, the conditioned medium 81c downstream of the second heat exchanger 118 is cooler than the source medium 81s upstream of the second heat exchanger 118. The heated refrigerant 111 flows from the second heat exchanger 118 to the compressor 112, where it is again compressed such that the vapor-compression cycle continues.

In the medium-heating mode, the heat pump 110 serves to transfer thermal energy from the water 91 to the medium 81, thereby heating the medium 81 while cooling the water 91. In the medium-heating mode, the refrigerant 111 flows from the compressor 112 to the second heat exchanger 118, which acts as the condenser for the loop 119. Accordingly, the refrigerant 111 in the second heat exchanger 118 rejects heat to the medium 81, thereby heating the medium 81. Thus, in the medium-heating mode, the conditioned medium 81c downstream of the second heat exchanger 118 is warmer than the source medium 81s upstream of the second heat exchanger 118. The refrigerant 111 then flows through the expander 116 to the first heat exchanger 114, which acts as the evaporator for the loop 119. Accordingly, the refrigerant 111 in the first heat exchanger 114 accepts heat from the water 91, thereby cooling the water 91. Thus, in the medium-heating mode, the conditioned water 91c downstream of the first heat exchanger 114 is cooler than the source water 91s upstream of the first heat exchanger 114. The heated refrigerant 111 flows from the first heat exchanger 114 to the compressor 112, where it is again compressed such that the vapor-compression cycle continues.

The temperature sensor array 150 may include one or more temperature sensors that aid the control system 170 in control of the heat pump system 100. For example, the sensor array 150 may include one or more water temperature sensors, such as a source water temperature sensor 151s sensing the temperature of the source water 91s and/or a conditioned water temperature sensor 151c sensing the temperature of the conditioned water 91c. Similarly, the sensor array 150 may include one or more medium temperature sensors, such as a source medium temperature sensor 152s sensing the temperature of the source medium 81s and/or a conditioned medium temperature sensor 152c sensing the temperature of the conditioned medium 81c. In certain embodiments, the sensor array 150 may include a heating/cooling zone temperature sensor 153 sensing the temperature of the heating/cooling zone 78. In certain embodiments, the sensor array 150 may include one or more refrigerant temperature sensors 154 that sense the temperature of the refrigerant 111 before and/or after the refrigerant 111 passes through the first heat exchanger 114. Additionally or alternatively, refrigerant temperature sensors 154 may sense the temperature of the refrigerant 111 before and/or after the refrigerant 111 passes through the second heat exchanger 118. In certain embodiments, the sensor array 150 may include an outdoor medium sensor 155 that senses the temperature of an outdoor medium 77 (e.g., earth, water, or air) with which the supplemental heat pump 160 is operable to exchange thermal energy.

The supplemental heat pump 160 generally includes a compressor 162 that compresses a supplemental heat pump refrigerant 161, a first heat exchanger 164 that transfers thermal energy between the refrigerant 161 and an outdoor medium 77 (e.g., earth, water, or air), an expander 166 that expands the refrigerant 161, and a second heat exchanger 168 that transfers thermal energy between the refrigerant 161 and the indoor medium 81. The compressor 162, first heat exchanger 164, expander 166, and second heat exchanger 168 are connected by piping such that a vapor-compression loop 169 is formed by the heat pump 160. In certain embodiments, the refrigerant 161 may comprise water. In certain embodiments, the outdoor medium 77 may be outdoor air, and the heat pump 160 may include a blower 167 that blows the outdoor air 77 over the second heat exchanger 168 to increase the rate of thermal energy transfer between the refrigerant 161 and the outdoor medium 77. In certain embodiments, the outdoor medium 77 may be water, such as water of a stream or retention pond. In certain embodiments, the heat pump 160 may be a geothermal heat pump, and the outdoor medium 77 may be earth. As should be appreciated, the supplemental heat pump 160 may be reversible such that the supplemental heat pump 160 is operable to both heat and cool the indoor medium 81. In certain embodiments, the supplemental heat pump 160 may be supplemented or replaced by additional or alternative heating/cooling devices, such as a boiler and/or a chiller. It is also contemplated that the boiler and/or chiller may be omitted.

In the illustrated form, the control system 170 is in communication with the water-source heat pump 110, the temperature sensor array 150, and the supplemental heat pump 160. The control system 170 controls operation of the water-source heat pump 110 to transfer thermal energy to and/or from the medium 81 as needed to heat and/or cool the heating/cooling zone 78. Should the heating/cooling provided by the water-source heat pump 110 prove insufficient, the control system 170 may operate the supplemental heat pump 160 to supplement the heating/cooling provided by the water-source heat pump 110. Should the temperature of the conditioned water 91c fall outside acceptable set-point values, the control system 170 may limit or cease operation of the water-source heat pump 110 to ensure that the conditioned water 91c falls within the accepted range of temperatures for the point of water use 94. Further details regarding the control offered by the control system 170 are provided herein.

Figure 2:
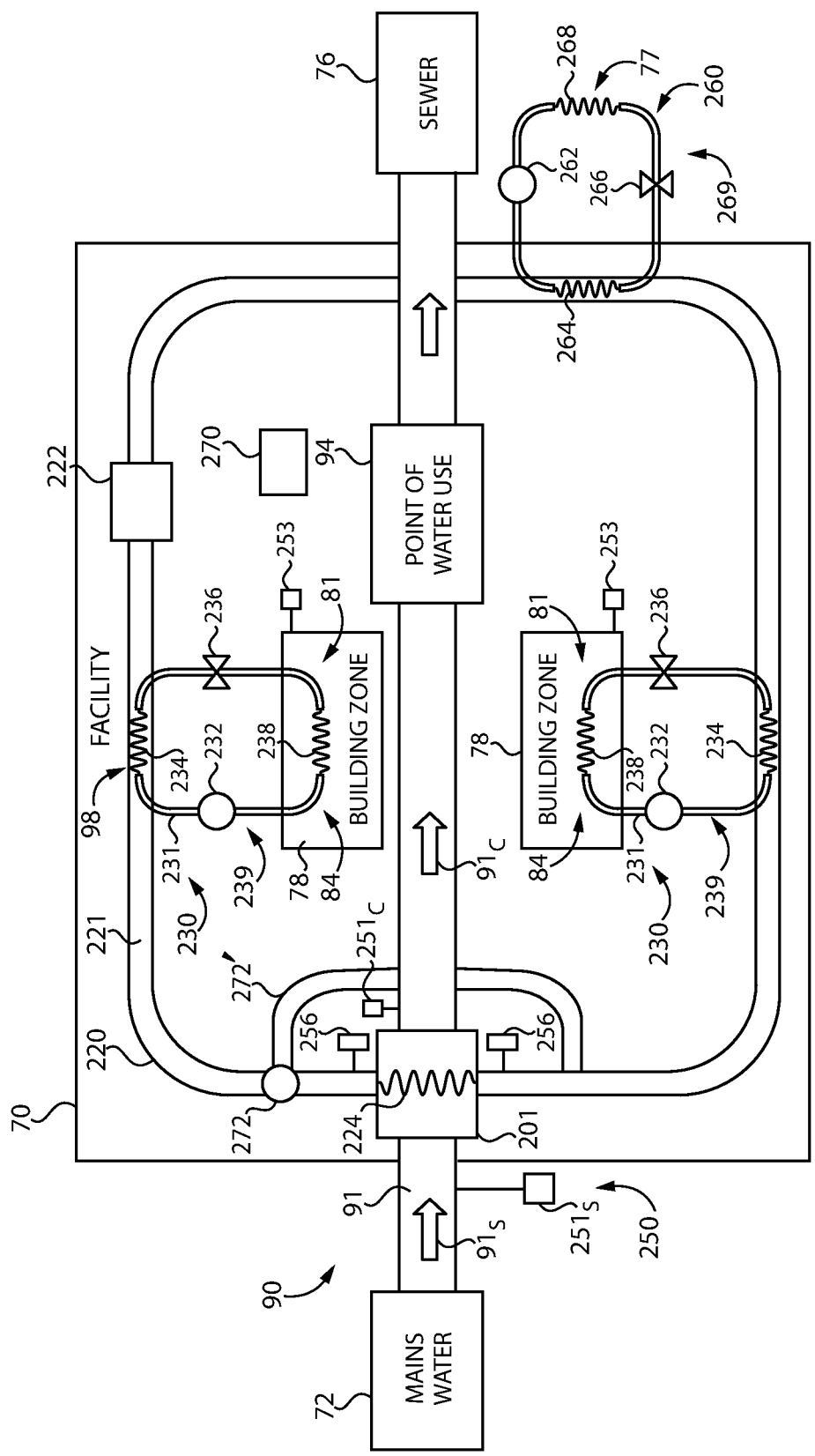
FIG. 2 is a schematic diagram of a system according to certain embodiments.

With additional reference to FIG. 2, illustrated therein is the facility 70 having installed thereto a system 200 according to certain embodiments. In the illustrated form, the system 200 includes a facility loop 220 having a facility loop refrigerant 221 flowing therethrough, and further includes at least one zone heat pump 230 operable to transfer thermal energy between the facility loop refrigerant 221 and a heating/cooling zone 78 of the facility 70. In certain embodiments, the system 200 may further include a temperature sensor array 250, a facility loop heat pump 260, and/or a control system 270. The temperature sensor array 250, the facility loop heat pump 260, and the control system 270 respectively correspond to the temperature sensor array 150, the supplemental heat pump 160, and the control system 170, and similar reference characters are used to indicate similar elements and features. In the interest of conciseness, the following description of the system 200 focuses primarily on elements and features of the system 200 that are different from those described above with reference to the system 100.

The facility loop 220 has the facility loop refrigerant 221 flowing therethrough, and may further include a fluid pump 222 configured to circulate the refrigerant 221 through the facility loop 220. While other refrigerants are contemplated, in the illustrated form, the facility loop refrigerant 221 comprises water, and may further comprise an antifreeze agent such as glycol. The facility loop 220 further includes a first heat exchanger 224 in thermal communication with the facility loop refrigerant 221 and the water stream 90. In certain embodiments, the heat exchanger 224 may be positioned in a holding tank 201 through which the domestic water 91 flows. The heat exchanger 224 exchanges thermal energy between the facility loop refrigerant 221 and the water stream 90, thereby converting source water $91s$ upstream of the heat exchanger 224 to conditioned water $91c$ downstream of the heat exchanger 224. As with the above-described system 100, the conditioned water $91c$ downstream of the heat exchanger 224 may be directed to a point of domestic water use 94, such as a shower, a faucet, a washing machine, a dishwasher, a hot water heater, a toilet, or another point of domestic water use.

Each zone heat pump 230 defines a corresponding and respective vapor-compression loop 239 having a corresponding and respective refrigerant 231 flowing therethrough. Each vapor-compression loop 239 includes a compressor 232 operable to compress the refrigerant 231 and a first heat exchanger 234 operable to transfer thermal energy between the facility loop refrigerant 221 and the zone heat pump refrigerant 231, thereby defining a point of use 98 for the first medium or facility loop refrigerant 221. Each vapor-compression loop 239 further includes an expander 236 configured to expand the refrigerant 231, and a second heat exchanger 238 that transfers thermal energy between the zone heat pump refrigerant 231 and the indoor medium 81. As one example, the indoor medium 81 may be provided as air that is pumped into the heating/cooling zone 78, or air that is heated/cooled by radiant heating/cooling. As another example, the indoor medium 81 may be provided as a refrigerant that is routed through the floor of the heating/cooling zone 78 for radiant heating/cooling of the zone 78. Thus, the heat exchanger 238 and/or the heating/cooling zone 78 may define the point of medium use 84.

Each facility loop heat pump 260 defines a corresponding and respective vapor-compression loop 269 having a corresponding and respective facility loop heat pump refrigerant 261 flowing therethrough. Each vapor-compression loop 269 includes a compressor 262 operable to compress the refrigerant 261, and a first heat exchanger 264 operable to transfer thermal energy between the facility loop refrigerant 221 and the heat pump refrigerant 261. Each vapor-compression loop 269 further includes an expander 266 configured to expand the refrigerant 261, and a second heat exchanger 268 operable to transfer thermal energy between the zone heat pump refrigerant 261 and the outdoor medium 77.

The facility loop heat pump 260 serves to transfer thermal energy between the facility loop refrigerant 221 and the outdoor medium 77. For example, during heating seasons (e.g., winter), the facility loop heat pump 260 may serve to transfer thermal energy from the outdoor medium 77 to the facility loop refrigerant 221 to provide the facility loop 220 with thermal energy that can be transferred to the building zones 78 by the zone heat pumps 230. During cooling seasons (e.g., summer), the facility loop heat pump 260 may serve to reject thermal energy from the facility loop refrigerant 221 to the outdoor medium 77, thereby facilitating the transfer of thermal energy from the indoor medium 81 by the zone heat pumps 230 to aid in cooling the zones 78.

While the illustrated system 200 includes a single facility loop heat pump 260, it is to be appreciated that more or fewer facility loop heat pumps 260 may be utilized. For example, the system 200 may include multiple heat pumps 260, or the illustrated heat pump 260 may be replaced by a boiler that heats the facility loop refrigerant 221 and/or a chiller that chills the facility loop refrigerant 221.

The temperature sensor array 250 may include one or more facility loop sensors 256 that sense the temperature of the facility loop refrigerant 221 at various locations, such as just before and just after the point of thermal energy transfer defined by the heat exchanger 224. The temperature sensor array 250 may additionally or alternatively include sensors $251s$, $251c$, 253 corresponding to the above-described sensors $151s$, $151c$, 153. Additional details regarding sensors that may be provided in the temperature sensor array 250 are provided below with reference to FIG. 6.

In the illustrated form, the control system 270 includes a bypass valve 272 operable to selectively divert facility loop refrigerant 221 through a bypass line 272' such that the diverted refrigerant 221 does not exchange thermal energy with the water 91. The control system 270 may, for example, operate the bypass valve 272 to ensure that the temperature of the conditioned water $91c$ does not violate set-point values at the point of water use 94. Such operation may, for example, be performed based upon information received from the conditioned water temperature sensor $251c$.

Figure 3:
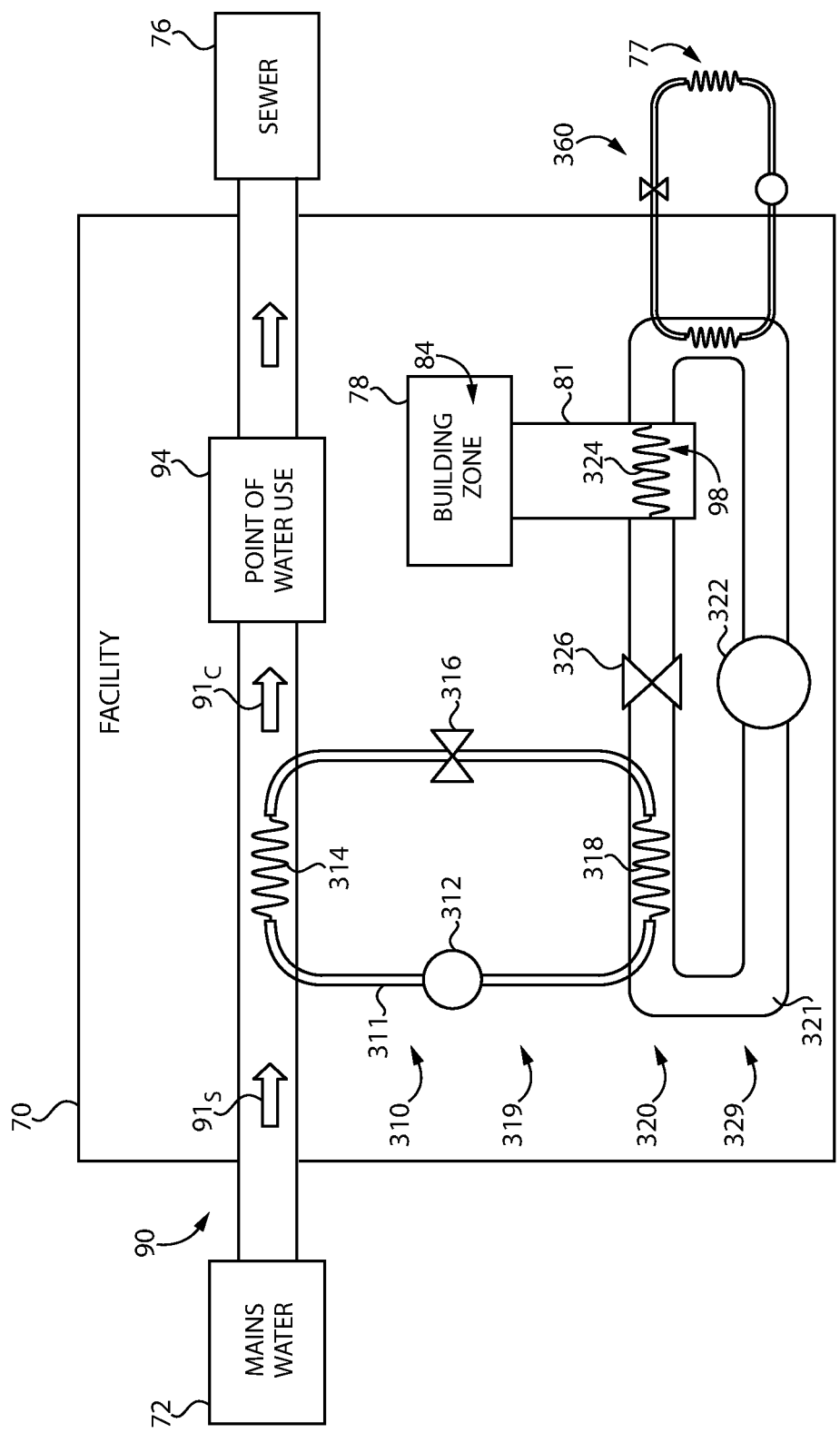
FIG. 3 is a schematic diagram of a system according to certain embodiments.

With additional reference to FIG. 3, illustrated therein is the facility 70 having installed thereto a system 300 according to certain embodiments. The system 300 includes a first heat pump 310 corresponding to the above-described heat pump 110 and a second heat pump 320. In certain embodiments, the system 300 may further include a facility loop heat pump 360 corresponding to the above-described facility loop heat pump 260. In addition or as an alternative to the facility loop heat pump 360, the system 300 may comprise a boiler and/or a chiller. While not specifically illustrated in FIG. 3, it is to be appreciated that the system 300 may include a temperature sensor array corresponding to the above-described temperature sensor arrays 150, 250 and/or a control system corresponding to the above-described control systems 170, 270. In the interest of conciseness, the following description of the system 300 focuses primarily on elements and features of the system 300 that differ with respect to those described above with reference to the systems 100, 200.

The first heat pump 310 is substantially similar to the above-described heat pump 110, and similar reference characters are used to indicate similar elements and features. For example, the first heat pump 310 defines a vapor-compression loop 319 having a refrigerant 311 flowing therethrough, and generally includes a compressor 312, a first heat exchanger 314, an expander 316, and a second heat exchanger 318, which respectively correspond to the above-described compressor 112, first heat exchanger 114, expander 116, and second heat exchanger 118. While not specifically illustrated in FIG. 3, it is to be appreciated that the heat exchanger 314 may be positioned in a holding tank through which the domestic water 91 flows. As described herein, the first heat pump 310 is configured to transfer thermal energy between the domestic water 91 and a second medium.

In the illustrated form, the second medium is provided as a second refrigerant 321, and the second heat pump 320 defines a second vapor-compression loop 329 through which the second refrigerant 321 flows. The second heat pump 320 includes a second compressor 322, a third heat exchanger 324, a second expander 326, and the second heat exchanger 318. The third heat exchanger 324 transfers thermal energy between the second refrigerant 321 and the indoor medium 81, thereby defining the point of use 98 for the second refrigerant 321. The indoor medium 81 may then be directed to the heating/cooling zone 78 for use at the point of medium use 84. As one example, the indoor medium 81 may be provided as air that is pumped into the heating/cooling zone 78, or air that is heated/cooled by radiant heating/cooling. As another example, the indoor medium 81 may be provided as a refrigerant that is routed through the floor of the heating/cooling zone 78 for radiant heating/cooling of the zone 78. Thus, the heat exchanger 334 and/or the heating/cooling zone 78 may define the point of medium use 84.

Like the first heat pump 310, the second heat pump 320 may be reversible such that the second heat pump 320 is operable in a medium-cooling mode in which the second heat pump 320 cools the second medium 331 (thereby heating the first medium or second refrigerant 321) and a medium-heating mode in which the second heat pump 320 heats the second medium 331 (thereby cooling the first medium or second refrigerant 321).

When the second heat pump 320 is run in its medium-cooling mode to cool the second medium 331, the first heat pump 310 may also be run in its medium-cooling mode to cool the second refrigerant 321. In such forms, the second heat exchanger 318 transfers thermal energy from the second refrigerant 321 to the first refrigerant 311, thereby heating the first refrigerant 311 and cooling the second refrigerant 321. Thus, the second heat exchanger 318 serves as the evaporator of the second loop 329 while serving as the condenser of the first loop 319. The thermal energy absorbed by the first refrigerant 311 is then rejected to the water 91 in the first heat exchanger 314 and/or to the outdoor medium 77 by the supplemental heat pump 360.

Conversely, when the second heat pump 320 is run in its medium-heating mode to heat the second medium 331, the first heat pump 310 may also be run in its medium-heating mode to heat the first medium or second refrigerant 321. In such forms, the second heat exchanger 318 transfers thermal energy from the first refrigerant 311 to the second refrigerant 321, thereby cooling the first refrigerant 311 and heating the second refrigerant 321. Thus, the second heat exchanger 318 serves as the condenser of the second loop 329 while serving as the evaporator of the first loop 319. The thermal energy rejected by the first refrigerant 311 can then be reabsorbed from the water 91 in the first heat exchanger 314 and/or transferred from the outdoor medium 77 by the supplemental heat pump 360.

Figure 4:
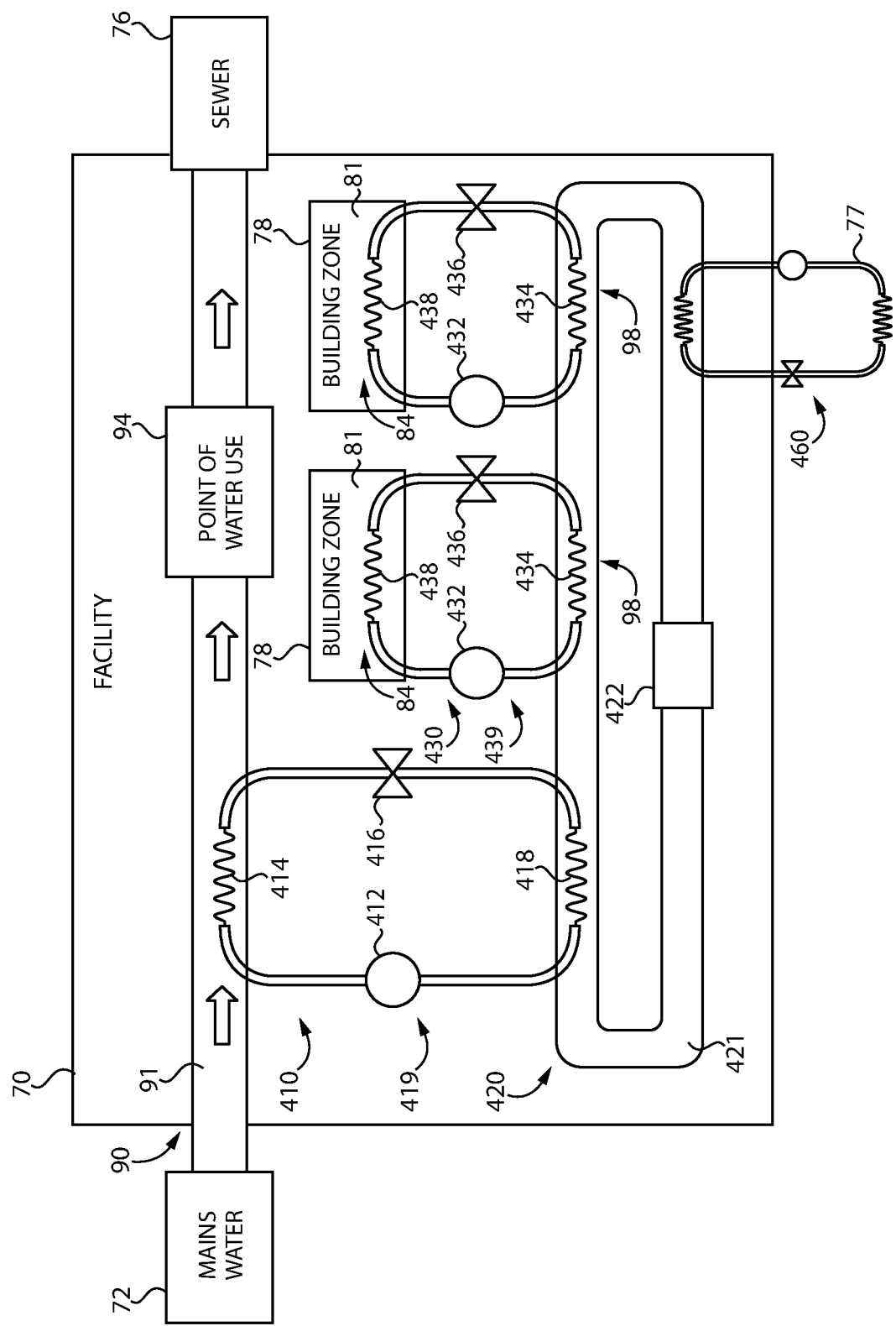
FIG. 4 is a schematic diagram of a system according to certain embodiments.

With additional reference to FIG. 4, illustrated therein is the facility 70 having installed thereto a system 400 according to certain embodiments. The system 400 generally includes a facility loop 420 having a refrigerant 421 flowing therethrough, a first heat pump 410 operable to transfer thermal energy between the facility loop refrigerant 421 and the domestic water 91, and one or more zone heat pumps 430 operable to transfer thermal energy between the facility loop refrigerant 421 and a corresponding heating/cooling zone 78 of the facility 70. In certain embodiments, the system 400 may further include a facility loop heat pump 460 corresponding to the above-described facility loop heat pump 260. In addition or as an alternative to the facility loop heat pump 460, the system 400 may comprise a boiler and/or a chiller. While not specifically illustrated in FIG. 4, it is to be appreciated that the system 400 may include a temperature sensor array corresponding to the above-described temperature sensor arrays 150, 250 and/or a control system corresponding to the above-described control systems 170, 270. In the interest of conciseness, the following description of the system 400 focuses primarily on elements and features of the system 400 that are different from those described above with reference to the systems 100, 200, 300.

The first heat pump 410 is substantially similar to the above-described heat pump 110, and similar reference characters are used to indicate similar elements and features. For example, the first heat pump 410 has a refrigerant 411 flowing therethrough and defines a vapor-compression loop 419. The vapor-compression loop 419 includes a compressor 412, a first heat exchanger 414, an expander 416, and a second heat exchanger 418, which respectively correspond to the above-described compressor 112, first heat exchanger 114, expander 116, and second heat exchanger 118. While not specifically illustrated in FIG. 4, it is to be appreciated that the heat exchanger 414 may be positioned in a holding tank through which the domestic water 91 flows.

The facility loop 420 has the facility loop refrigerant 421 flowing therethrough, and includes a fluid pump 422 operable to circulate the facility loop refrigerant 421 for heat transfer with the first heat pump 410 and the zone heat pumps 430. In the illustrated form, the facility loop refrigerant 421 comprises water, and may further comprises an antifreeze agent such as glycol. The facility loop refrigerant 421 is an example of an indoor medium that can be heated and/or cooled by operation of the first heat pump 410 for use at a point of medium use, which in the illustrated form is defined by the zone heat pumps 430.

In the system 400, each of the zone heat pumps 430 defines a corresponding and respective vapor-compression loop 439 having a corresponding and respective refrigerant 431 flowing therethrough. Each vapor-compression loop 439 includes a compressor 432 operable to compress the refrigerant 431, and a first heat exchanger 434 operable to transfer thermal energy between the facility loop refrigerant 421 and the zone heat pump refrigerant 431, thereby defining a point of use for the first medium or facility loop refrigerant 421. Each vapor-compression loop 439 further includes an expander 436 configured to expand the refrigerant 431, and a second heat exchanger 438 operable to transfer thermal energy between the zone heat pump refrigerant 431 and an indoor medium 81 that is provided to the corresponding zone 78. As one example, the indoor medium 81 may be provided as air that is pumped into the heating/cooling zone 78, or air that is heated/cooled by radiant heating/cooling. As another example, the indoor medium 81 may be provided as a refrigerant that is routed through the floor of the heating/cooling zone 78 for radiant heating/cooling of the zone 78. Thus, the heat exchanger 438 and/or the heating/cooling zone 78 may define the point of medium use 84.

Figure 5:
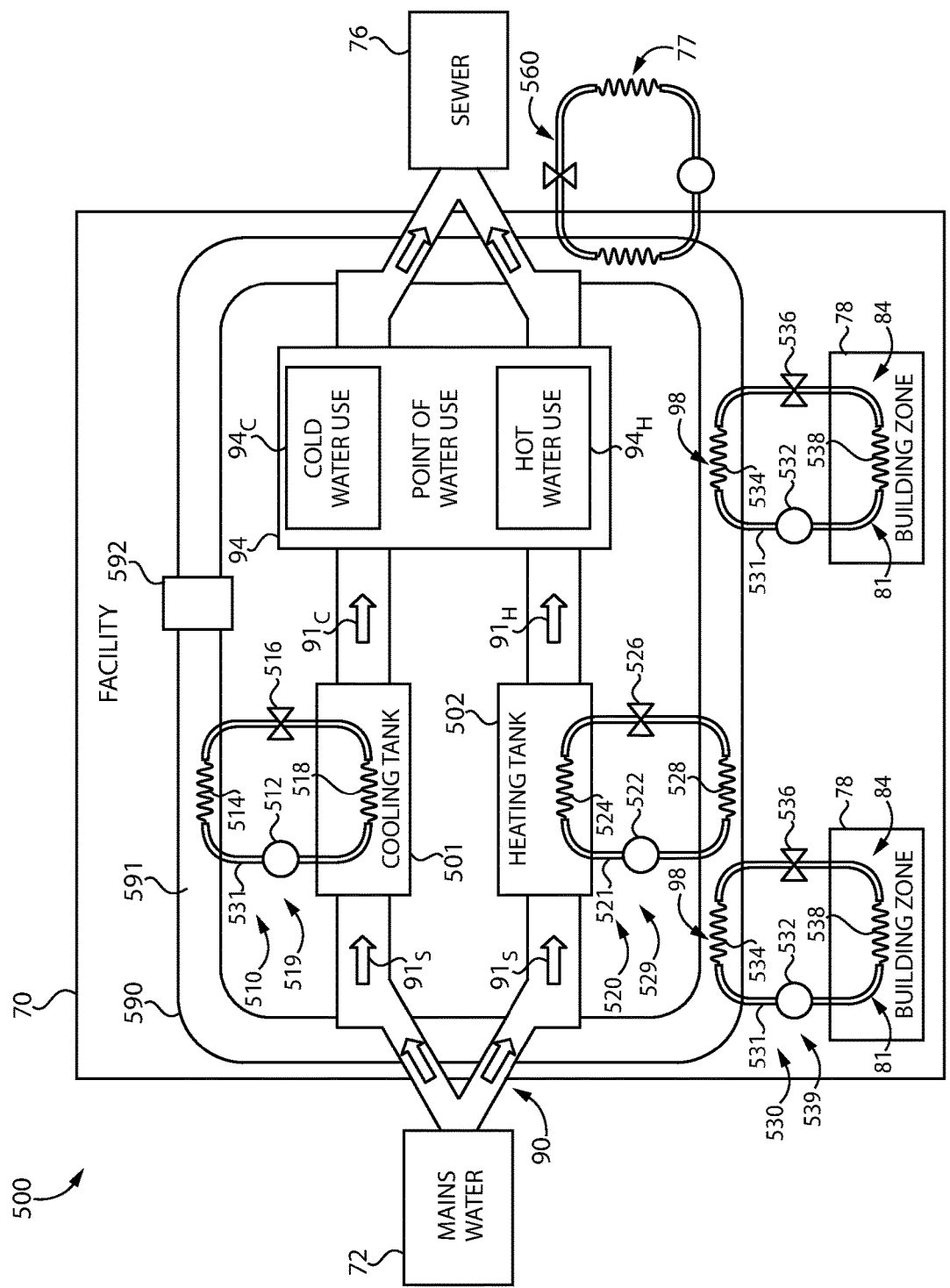
FIG. 5 is a schematic diagram of a system according to certain embodiments.

With additional reference to FIG. 5, illustrated therein is the facility 70 having installed thereto a system 500 according to certain embodiments. The system 500 generally includes a facility loop 590 having a facility loop refrigerant 591 flowing therethrough, a first water-source heat pump 510 operable to transfer thermal energy from a water cooling tank 501 to the facility loop 590, a second water-source heat pump 520 operable to transfer thermal energy from the facility loop 590 to a water heating tank 502, and one or more zone heat pumps 530, each of which is operable to transfer thermal energy between the facility loop refrigerant 591 and an indoor medium for use in a corresponding heating/cooling zone 78. In certain embodiments, the system 500 may further include a facility loop heat pump 560 corresponding to the above-described facility loop heat pump 260. In addition or as an alternative to the facility loop heat pump 560, the system 500 may comprise a boiler and/or a chiller. While not specifically illustrated in FIG. 5, it is to be appreciated that the system 500 may include a temperature sensor array corresponding to the above-described temperature sensor arrays 150, 250 and/or a control system corresponding to the above-described control systems 170, 270. In the interest of conciseness, the following description of the system 500 focuses primarily on elements and features of the system 500 that are different from those described above with reference to the systems 100, 200, 300, 400.

The first heat pump 510 has a first refrigerant 511 flowing therethrough, and defines a first vapor-compression loop 519. The first vapor-compression loop 519 generally includes a compressor 512 operable to compress the refrigerant 511, a first heat exchanger in the form of a condenser 514 operable to reject heat from the refrigerant 511 to the facility loop refrigerant 591, an expander 516 operable to expand the refrigerant 511, and a second heat exchanger in the form of an evaporator 518 operable to accept heat from the water 91 in the cooling tank 501. As should be appreciated, operation of the first heat pump 510 transfers thermal energy from the water 91 in the cooling tank 501 to the facility loop refrigerant 591, thereby cooling the water 91 in the cooling tank 501 and heating the facility loop refrigerant 591.

The second heat pump 520 has a second refrigerant 521 flowing therethrough, and defines a second vapor-compression loop 529. The second vapor-compression loop 529 generally includes a compressor 522 operable to compress the refrigerant 521, a first heat exchanger in the form of a condenser 524 operable to reject heat from the refrigerant 521 to the heating tank 502, an expander 526 operable to expand the refrigerant 521, and a second heat exchanger in the form of an evaporator 528 operable to accept heat from the facility loop refrigerant 591. As should be appreciated, operation of the second heat pump 520 transfers thermal energy from the facility loop refrigerant 591 to the water 91 in the heating tank 502, thereby heating the water 91 in the heating tank 502 and cooling the facility loop refrigerant 591.

Each of the zone heat pumps 530 defines a corresponding and respective vapor-compression loop 539 having a corresponding and respective refrigerant 531 flowing therethrough. Each vapor-compression loop 539 includes a compressor 532 operable to compress the refrigerant 531, and a first heat exchanger 534 operable to transfer thermal energy between the facility loop refrigerant 591 and the zone heat pump refrigerant 531, thereby defining a point of use 98 for the first medium or facility loop refrigerant 591. Each vapor-compression loop 539 further includes an expander 536 configured to expand the refrigerant 531, and a second heat exchanger 538 operable to transfer thermal energy between the zone heat pump refrigerant 531 and an indoor medium 81 that is provided to the corresponding zone 78. As one example, the indoor medium 81 may be provided as air that is pumped into the heating/cooling zone 78, or air that is heated/cooled by radiant heating/cooling. As another example, the indoor medium 81 may be provided as a refrigerant that is routed through the floor of the heating/cooling zone 78 for radiant heating/cooling of the zone 78. Thus, the heat exchanger 538 and/or the heating/cooling zone 78 may define the point of medium use 84.

The facility loop 590 has the facility loop refrigerant 591 flowing therethrough, and includes a fluid pump 592 operable to circulate the facility loop refrigerant 591 for heat transfer with the heat pumps 510, 520, 530. In the illustrated form, the facility loop refrigerant 591 comprises water, and may further comprises an antifreeze agent such as glycol. The facility loop refrigerant 591 is another example of an indoor medium that can be heated by operation of the first heat pump 510 and/or cooled by operation of the second heat pump 510 for use at a point of medium use 98, which in the illustrated form is defined by the first heat exchangers 534 of the zone heat pumps 530.

It should be appreciated that the cooling imparted to the water 91 in the cooling tank 501 is an example of conditioning the water 91, and that the cooled water $91c$ may be directed to a point of cold water use $94c$, such as a faucet, an icemaker, a shower, a washing machine, a toilet, a sprinkler system, or another implement or piece of equipment that typically utilizes cold mains water. Similarly, the heating imparted to the water 91 is another example of conditioning the water 91, and the heated water 91H may be directed to a point of hot water use 94H, such as a shower, a dishwasher, a faucet, a washing machine, a water heater, or another implement or piece of equipment that typically utilizes heated water.

Figure 6:
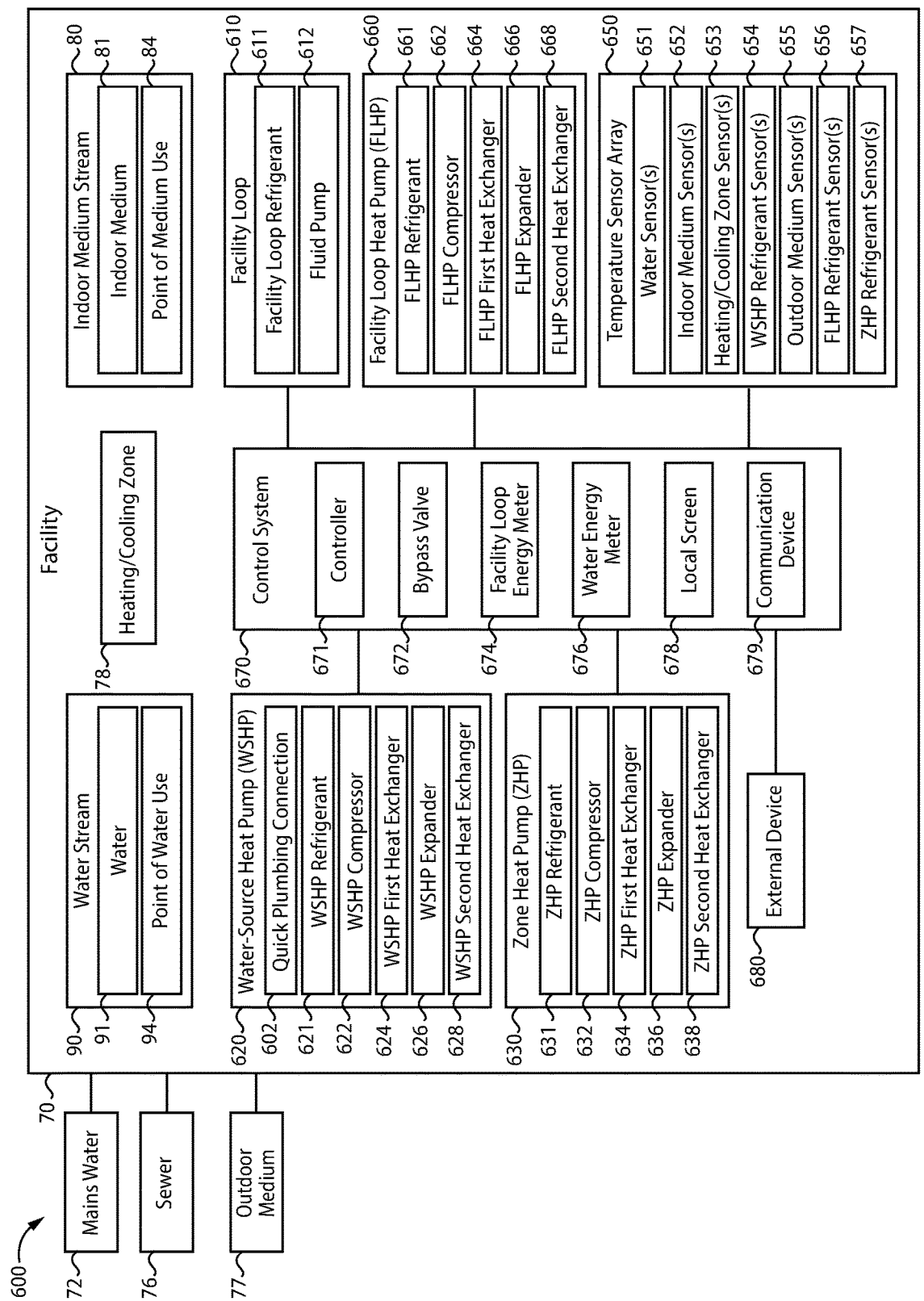
FIG. 6 is a schematic block diagram of a system according to certain embodiments.

With additional reference to FIG. 6, illustrated therein is a schematic block diagram of a facility 70 having installed thereto a system 600, which may, for example, be provided as any of the above-described systems 100, 200, 300, 400, 500. The illustrated system 600 includes a facility loop 610 including a fluid pump 612 that circulates refrigerant 611 within the facility loop 610, a water-source heat pump 620 that transfers thermal energy between the domestic water stream 90 and the facility loop 610, a zone heat pump 630 that transfers thermal energy between the facility loop 610 and a heating/cooling zone 78 of the facility 70, a temperature sensor array 650 that monitors the temperatures of various media, a facility loop heat pump 660 that transfers thermal energy between the facility loop 610 and the outdoor medium 77, and a control system 670 according to certain embodiments. In certain embodiments, one or more components of the system 600 may be pre-engineered and installed on a skid for optimal layout and easy shipment and installation.

The facility 70 includes a water stream 90 that directs water 91 from a water source 72 to a point of water use 94, and which may further direct water 91 from the point of water use 94 to a sewer 76. An outdoor medium 77 (e.g., air, water, and/or earth) is provided at an outdoor location of the facility 70. The facility 70 includes one or more heating/cooling zones 78. The system 600 transfers thermal energy between an indoor medium 81 and the water 91 to heat and/or cool the heating/cooling zones 78. Further details regarding the facility 70 and the features associated therewith can be found above.

The facility loop 610 circulates facility loop refrigerant 611 through the facility 70, and includes a fluid pump 612 that facilitates such circulation of the facility loop refrigerant 611. Depending upon the embodiment, the facility loop 610 may correspond to one or more of the medium stream 80 illustrated in FIG. 1, the facility loop 220 illustrated in FIG. 2, the second heat exchanger loop 329 illustrated in FIG. 3, the facility loop 420 illustrated in FIG. 4, or the facility loop 590 illustrated in FIG. 5. The features and functions of these components are described above, and need not be repeated herein.

The system 600 further includes a first heat exchanger 624 that facilitates the transfer of thermal energy between the facility loop refrigerant 611 and the domestic water stream 90. The first heat exchanger 624 may correspond to the heat exchangers 114, 224, 314, 414, 514, 528 illustrated in FIGS. 1-5. In certain embodiments, such as those illustrated in FIG. 1 and FIGS. 3-5, the first heat exchanger 624 may constitute a portion of the vapor-compression loop 629 of a water-source heat pump 620. Such a water-source heat pump 620 may correspond to the heat pumps 110, 310, 410, 510 illustrated in FIGS. 1 and 3-5. The features and functions of these components are described above, and need not be repeated herein.

The system 600 may further include a second heat exchanger 638 that facilitates the transfer of thermal energy between the facility loop refrigerant 611 and the heating/cooling zone 78. The heat exchanger 638 may, for example, correspond to the heat exchangers 118, 238, 324, 438, 538 illustrated in FIGS. 1-5. In certain embodiments, such as those illustrated in FIGS. 2, 4 and 5, the heat exchanger 638 may constitute a portion of the vapor-compression loop 639 of a zone heat pump 630. Such a zone heat pump 630 may correspond to the heat pumps 230, 430, 530 illustrated in FIGS. 2, 4, and 5. The features and functions of these components are described above, and need not be repeated herein.

The system 600 may further include a temperature sensor array 650 configured to sense the temperatures of various media. The temperature sensor array 650 may include one or more water temperature sensors 651 operable to sense the temperature of the water 91 at one or more points in the water stream 90, such as the above-described water temperature sensors 151s, 151c. In certain embodiments, the temperature sensor array 650 may include one or more indoor medium temperature sensors 652 operable to sense the temperature of the indoor medium 81 at one or more points in the indoor medium stream 80, such as the above-described indoor medium temperature sensors 152s, 152c. In certain embodiments, the temperature sensor array 650 may include one or more heating/cooling zone temperature sensors 653 operable to sense the temperature of the heating/cooling zone 78, such as the above-described heating/cooling zone temperature sensor 153. In certain embodiments, the temperature sensor array 650 may include one or more refrigerant temperature sensors 654 operable to detect the temperature of the refrigerant in the water-source heat pump 620, such as the refrigerant temperature sensors 154. In certain embodiments, the temperature sensor array 650 may include one or more outdoor medium temperature sensors 655 operable to sense the temperature of the outdoor medium 77, such as the outdoor medium temperature sensor 155. In certain embodiments, the temperature sensor array 650 may include one or more facility loop temperature sensors 656 operable to sense the temperature of the facility loop refrigerant 611 at one or more points along the facility loop 610, such as the above-described facility loop temperature sensors 256. In certain embodiments, the temperature sensor array 650 may include one or more zone heat pump refrigerant temperature sensors 657 operable to detect the temperature of the zone heat pump refrigerant 631 at one or more points within the zone heat pump vapor-compression loop 639. The features and functions of these components or their analogues are described above, and need not be repeated herein.

The system 600 may further include a facility loop heat pump 660 operable to transfer thermal energy between the facility loop refrigerant 611 and the outdoor medium 77. The facility loop heat pump 660 may, for example, correspond to the supplemental heat pump 160 illustrated in FIG. 1 and/or the facility loop heat pumps 260, 360, 460, 560 illustrated in FIGS. 2-5. It is also contemplated that the facility loop heat pump 660 may be supplemented or replaced by a boiler and/or a chilling tower.

The control system 670 is in communication with various other components of the system 600 such that a controller 671 of the control system 670 is operable to control operation of the system 600. The control system 670 may, for example, ensure that the pump 612 serving the facility loop 610 is turned on whenever there is flow in the domestic water stream 90 through the heat exchanger 624 or holding tank/heat pump 620. For example, it is possible that irrigation and cooling tower make-up water is turned on at night when the building HVAC system is turned off. But when domestic water 91 is being used, there is an opportunity to exchange thermal energy with the facility loop 610. There is typically more than enough water/mass in the facility loop 610 to absorb/reject any and all heat to/from the domestic water 91 when the domestic water 91 is running.

In order to make the system convenient to install, operate, maintain, and monitor, the heat exchanger 424 or holding tank with heat pump (e.g. holding the holding tanks 201, 501, 502) may include one or more additional features not specifically illustrated in FIGS. 1-5. In certain embodiments, the water-source heat pump 620 may include quick plumbing connections 602 to the domestic water stream 90 and facility loop 610. In embodiments in which a holding tank (e.g., the tanks 201, 501, 502) is used, the tank may include quick electrical connections to the water-source heat pump 620.

In certain embodiments, the control system 670 may include an automatic bypass valve 672 to prevent overheating or cooling the domestic water 91. Operation of the automatic bypass valve 672 may be based upon information received from the water temperature sensors 651, for example as described above with reference to the bypass valve 272 illustrated in FIG. 2.

In certain embodiments, the control system 670 may include a facility loop energy meter 674 that monitors the flow and temperature rise/drop of the facility loop refrigerant 611 across the water-source heat pump 620 (or heat exchanger 224) to calculate the energy savings and verify for owners that the system 600 is providing cost savings. The energy meter 674 may, for example, receive information from the facility loop temperature sensor(s) 656 and/or a facility loop refrigerant flowmeter.

In certain embodiments, the control system 670 may include a water energy meter 676 that monitors the flow and temperature rise/drop of the domestic water 91 across the heat pump 620 (or heat exchanger 224) to ensure the temperature of the conditioned water 91c being directed to faucets and other endpoints are within prescribed limits or set-points. When the water energy meter 676 indicates that the temperature of the conditioned water 91c falls outside the prescribed limits or set-points, the bypass valve 672 may be activated.

In certain embodiments, the control system 670 may include a local screen 678 or remote communications 679 to an external device 680 that can show the above data and/or make control decisions as necessary.

Figure 7:
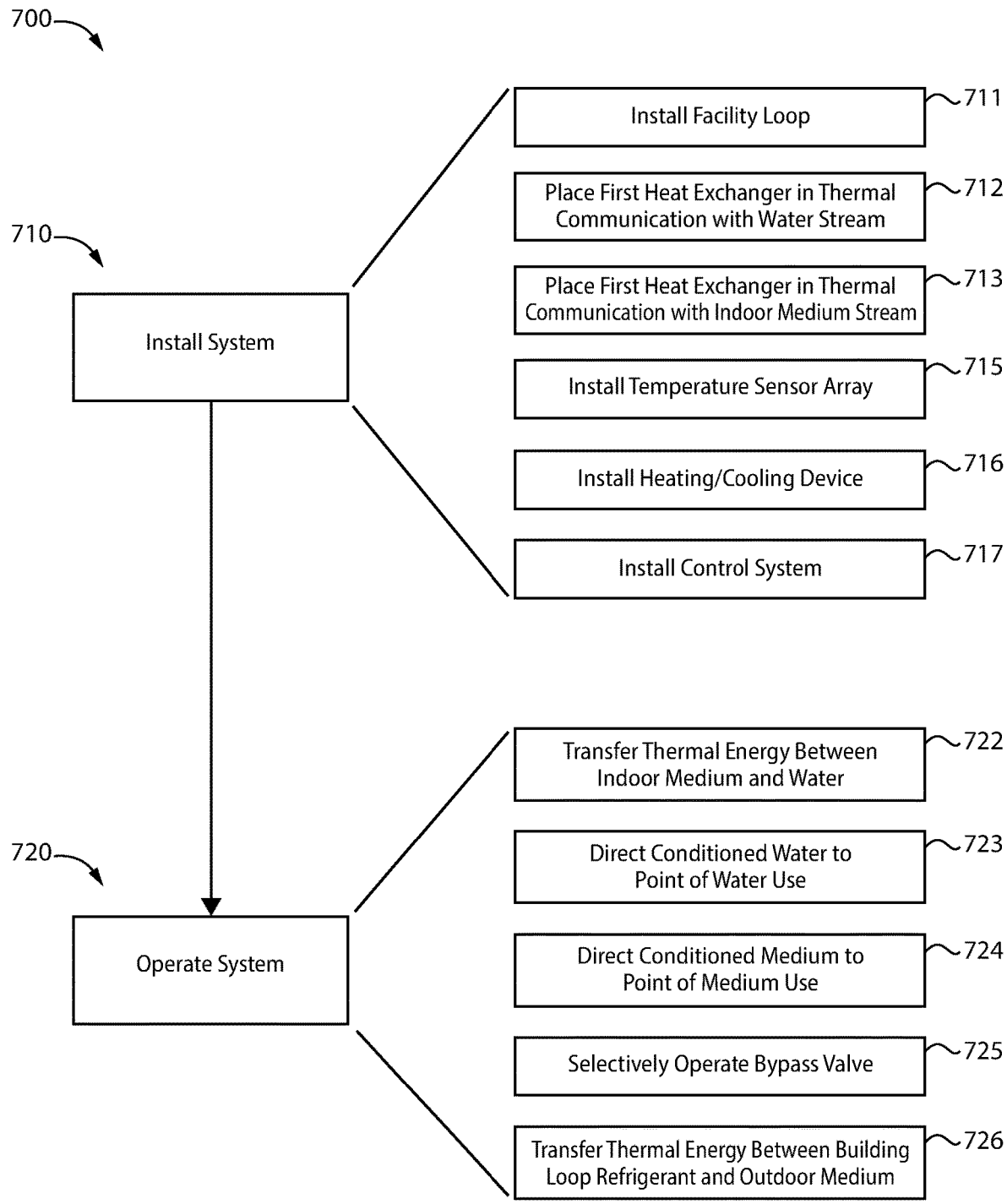
FIG. 7 is a schematic flow diagram of a process according to certain embodiments.

With additional reference to FIG. 7, an exemplary process 700 that may be performed using one or more of the above-described systems 100, 200, 300, 400, 500, 600 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 700 may be performed wholly or in part by engineers, building designers, construction/installation personnel, and/or the control system 670, or that the blocks may be distributed among one or more of the elements and/or additional devices, parties, and/or systems that are not specifically illustrated in FIGS. 1-6. Additionally, while the blocks are illustrated in a relatively serial fashion, it is to be understood that two or more of the blocks may be performed concurrently or in parallel with one another.

In the interest of conciseness, the process 700 will be primarily described herein with specific reference to the system 600 illustrated in FIG. 6. Those skilled in the art will readily appreciate, however, that at least some blocks of the process 700 may be performed using one or more of the systems 100, 200, 300, 400, 500 illustrated in FIGS. 1-5.

The process 700 may include block 710, which generally involves installing a heat pump system 600 (such as one of the above-described systems 100, 200, 300, 400, 500) to a facility 70. The facility 70 utilized in the process 700 generally includes a domestic water stream 90 that flows from a domestic water source 72 to a point of domestic water use 94, and may further include one or more heating/cooling zones 78. Generally speaking, block 710 involves placing a first heat exchanger 624 in thermal communication with the water stream 90 and the indoor medium stream 80 such that thermal energy can be transferred between the indoor medium 81 and the water 91 upstream of the respective points of use 84, 94.

Block 710 may include block 711, which generally involves installing a facility loop 610 to the facility 70. When installed, the facility loop 610 has a facility loop refrigerant 611 flowing therethrough. The facility loop 610 may, for example, include a fluid pump 612 that circulates the facility loop refrigerant 611.

Block 710 includes block 712, which generally involves placing a first heat exchanger 624 in thermal communication with the water stream 90. In the illustrated form, block 712 involves installing the first heat exchanger 624 to the water stream 90 upstream of the point of water use 94. In certain embodiments, block 712 may involve placing the first heat exchanger 624 in direct thermal communication with the water stream 90, for example by causing the water 91 to flow over the heat exchanger 624. In certain embodiments, block 712 may involve installing the first heat exchanger 624 to a tank through which the water 91 flows.

In certain forms, block 712 further involves placing the first heat exchanger 624 in thermal communication with the building loop refrigerant 611. In certain embodiments (such as that illustrated in FIG. 2), block 712 may involve placing the first heat exchanger 624 in direct thermal communication with the facility loop refrigerant 611. In other embodiments (such as those illustrated in FIGS. 1 and 3-5), block 712 may involve placing the first heat exchanger 624 in indirect thermal communication with the facility loop refrigerant 611. For example, block 712 may involve installing a water-source heat pump 620 between the water stream 90 and the facility loop 610 such that the first heat exchanger 624 is in indirect thermal communication with the facility loop refrigerant 611 (e.g., via the water-source heat pump refrigerant 621 and the water-source heat pump second heat exchanger 628). In certain embodiments, the installation of the water-source heat pump 620 may be facilitated by the quick plumbing connections 602.

Block 710 further includes block 713, which involves placing the first heat exchanger 624 in thermal communication with the indoor medium stream 80 upstream of the point of indoor medium use 84. In certain forms, block 713 involves placing a second heat exchanger 638 in thermal communication with the building loop refrigerant 611 and the indoor medium 81 such that the first heat exchanger 624 is in thermal communication with the indoor medium 81 via the building loop refrigerant 611 and the second heat exchanger 638. In certain embodiments, block 713 may involve placing the second heat exchanger 638 in direct thermal communication with the building loop refrigerant 611 and/or the indoor medium 81. In certain embodiments, block 713 may involve placing the second heat exchanger 638 in direct thermal communication with both the building loop refrigerant 611 and the indoor medium 81. In other embodiments, block 713 may involve installing a zone heat pump 630 such that the second heat exchanger 638 is in indirect thermal communication with one of the building loop refrigerant 611 or the indoor medium 81 (e.g., via the zone heat pump refrigerant 631 and the zone heat pump first heat exchanger 634).

Block 710 may further include block 715, which generally involves installing a temperature sensor array. Block 715 may, for example, involve installing one or more of the above-described sensors 651-657 at an appropriate location such that each sensor 651-657 is operable to sense the temperature of a corresponding medium. Block 715 may further involve installing one or more flowrate meters operable to sense the flowrate of water 91 and/or the facility loop refrigerant 611.

Block 710 may further include block 716, which generally involves installing a heating/cooling device to the building loop 610. In the illustrated form, block 716 involves installing the facility loop heat pump 660 such that the facility loop heat pump 660 is operable to transfer thermal energy between the building loop refrigerant 611 and the outdoor medium 77. It is also contemplated that block 716 may involve installing additional or alternative devices to heat and/or cool the building loop refrigerant 611, such as a boiler and/or a chiller.

Block 710 may further involve block 717, which generally involves installing a control system 670. Block 717 may, for example, involve placing the control system 670 in communication with the facility loop 610, the water-source heat pump 620, the zone heat pump 630, and/or the facility loop heat pump 660 such that the control system 670 is operable to control operation of the facility loop 610, the water-source heat pump 620, the zone heat pump 630, and/or the facility loop heat pump 660. In certain embodiments, block 717 may involve placing the control system 670 in communication with the temperature sensor array 650 such that the control system 670 is capable of controlling operation of the system 600 based at least in part upon information received from the temperature sensor array 650. In certain embodiments, block 717 may involve installing the bypass valve 672, the facility loop energy meter 674, the water energy meter 676, and/or the local screen 678. In certain embodiments, block 717 may involve placing the control system 670 in communication with the external device 680 (e.g., via the communication device 679) such that the external device 680 is operable to receive information from the control system 670, send information to the control system 670, and/or control operation of the control system 670.

The process 700 may further include block 720, which generally involves operating the installed system 600. As should be appreciated, block 720 may, for example, be performed under the control of the control system 670 and/or the external device 680.

Block 720 includes block 722, which involves transferring thermal energy between the indoor medium 81 and the water 91 via the first heat exchanger 624. Block 722 may, for example, involve operating the water-source heat pump 620 and/or the zone heat pump 630. In certain embodiments, block 722 may involve operating the water-source heat pump 620 such that the heat pump 620 transfers thermal energy relatively directly between the indoor medium 81 and the water 91. In other embodiments, block 722 may involve operating the water-source heat pump 620 to indirectly transfer thermal energy between the indoor medium 81 and the water 91 via one or more intermediate media. For example, block 722 may involve operating the zone heat pump 630 such that thermal energy is transferred between the indoor medium 81 and the water 91 via the facility loop refrigerant 611 and/or the zone heat pump refrigerant 631.

Block 720 further includes block 723, which generally involves directing the conditioned water 91c to the point of domestic water use 94. The point of domestic water use 94 may, for example be a faucet, a shower, a toilet, a washing machine, a dishwasher, an indoor or outdoor sprinkler system, a water heating tank, or another point of water use.

Block 720 further includes block 724, which generally involves directing the conditioned medium 81c to the point of indoor medium use 84. For example, in embodiments in which the indoor medium 81 is provided as air, block 724 may involve directing the heated or cooled air to the heating/cooling zone 78. As another example, in embodiments in which the indoor medium 81 is provided as a radiant heating/cooling medium, block 724 may involve directing the radiant heating/cooling medium through a radiator and/or through lines installed to the floor, ceiling, and/or walls of the heating/cooling zone 78.

Block 720 may further include block 725, which generally involves selectively operating the bypass valve 672 to divert at least a portion of the building loop refrigerant 611 around the first heat exchanger 624 such that the at least a portion of the refrigerant 611 does not exchange thermal energy with the water 91. Block 725 may, for example, involve diverting at least a portion of the refrigerant through the bypass valve 672 in response to information from the water temperature sensor(s) 651 indicating that the conditioned water 91c satisfies a threshold temperature and/or falls outside of predetermined limits or set-points.

Block 720 may further include block 726, which generally involves selectively operating the facility loop heat pump 660 to transfer thermal energy between the building loop refrigerant 611 and the outdoor medium 77. Block 736 may, for example, involve operating the facility loop heat pump 660 to transfer thermal energy between the building loop refrigerant 611 and the outdoor medium 77 in response to information from the facility loop heat pump refrigerant sensor(s) 656 indicating that the facility loop refrigerant 611 satisfies a threshold temperature and/or falls outside of predetermined limits or set-points.

As should be evident from the foregoing, the systems and methods described herein tap into the domestic water 91 serving the facility 70 and use it as a heat source/sink before it is used at the point of water use 94. In many situations, there is more domestic water 91 flowing into a facility 70 than gray/black water flowing out of the facility 70 due to irrigation water losses and/or cooling tower evaporation. Additionally, the temperature of the domestic supply water 91s is typically cooler than sewer water because the incoming water lines are underground and mimic a geothermal loop, whereas sewer water includes hot water from faucets and showers. The result is that water 91 from the water main 72, besides being pure and solid-free, has a greater volume/mass in which to absorb/reject heat and a lower temperature in which to cool various types of facilities, which are usually cooling dominant.

As noted above, the concept of using municipal water with heat pumps to heat and cool buildings has been around for some time, but rarely implemented due to the high cost and waste of the water for this purpose. The incremental water cost might be acceptable in some markets, but the incremental sewer cost is typically prohibitive. The systems and methods described herein, by contrast, may eliminate the incremental water and sewer costs by utilizing only that water 91 that would already be utilized during normal operation of the facility 70.

While certain existing systems eliminate the high water use by installing a heat exchanger between the underground water line and the building heat pump water loop, code/zoning issues and the additional infrastructure cost has limited its commercial success. By contrast, the systems and methods described herein may eliminate the code/zoning issues and infrastructure costs, and can be achieved with relatively low additional start-up costs.

Other existing systems tap into the downstream waste of a building to help heat and cool a heat pump water loop. Specifically, a heat exchanger taps into the sewer water before it leaves a building. However, the first cost and operating cost of moving waste water with solids (human waste, paper, plastic, etc.) through a heat exchanger limits the economic viability and adoption of the system. By utilizing the pure water 91 upstream of the point of use 94, the systems and methods described herein also obviate the need to deal with human waste, paper, plastic, and other solids that can clog a typical heat exchanger.

The systems and methods described herein may be especially advantageous in facilities that consume large quantities of water. Building applications such as restaurants, hotels, and golf clubs that use large volumes of water for food preparation, dishwashing, showering, flushing toilets, and watering lawns are examples of facilities that would particularly benefit from the systems and methods described herein. In many cases, it is relatively unimportant what temperature the domestic water is within certain limits. For example, as long as the domestic water temperature serving cold water faucets is between 40° F. and 70° F., and the domestic water temperature serving the hot water heater is between 60° F. and 90° F., there will typically be no complaints from the end-users of this water. Furthermore, the temperature of the water is almost entirely irrelevant for certain applications, such as the water serving toilets, irrigation systems, and cooling tower make-up water.

In certain embodiments, (e.g. the systems 100, 200, 300, 400), the conditioned domestic water 91c downstream of the heat exchanger 114, 214, 314, 414 or holding tank (e.g., the holding tank 201) may be utilized to serve both cold water and hot water lines. Since most commercial buildings are cooling dominant, this means the domestic water 91 will typically get warmer rather than cooler. And while this is an advantage for water serving the hot water heater, it can be a disadvantage at times for cold water (e.g., used for drinking purposes). However, far less cold water is typically used (e.g., for drinking purposes) than hot water (e.g., for washing and cleaning) in most buildings. And far less cold water is used (e.g., for drinking purposes) than for purposes in which the actual temperature of the water is largely irrelevant, such as flushing toilets and urinals, irrigating lawns and gardens, and replacing evaporated water in cooling towers. Additionally, the small volume of drinking water can easily be chilled with ice or a water cooler, each of which is a small energy penalty compared to the large energy savings that may be provided by the systems and methods described herein.

In certain embodiments, such as that described with reference to FIG. 5, a system 500 may include two holding tanks 501, 502. A water cooling tank 501 provides cooled water to the cold water point of use 94c, and the first heat pump 510 is operable to transfer thermal energy from the cooling tank 501 to the facility loop 590. A water heating tank 502 provides heated water to the hot water point of use 94H, and the second heat pump 520 is operable to transfer thermal energy from the facility loop 590 to the heating tank 502. The heat pumps 510, 520 may transfer thermal energy between each tank 501, 502 and the facility loop 590 as desired to maximize energy savings. For example, as guests in a hotel flush hundreds of toilets, they would be conditioning the facility loop 590 for additional heating or cooling capacity. As these same guests take hundreds of showers, they would be doing the same thing.

An additional advantage that may be presented by the systems and methods described herein is that the incremental cost of installing a prepackaged heat exchanger system is much less than installing a conventional geothermal ground loop, and approaches the efficiency of such geothermal ground loops. A primary difference between the two, however, is that drilling contractor with a drilling rig is not required to drill multiple boreholes for a geothermal bore field. The fact is that many if not most commercial buildings do not have the space available for a ground loop, or they do not want to interrupt their employee/customer parking to install such a ground loop.

In certain embodiments, the capacity of systems described herein may not necessarily provide all of the heating and cooling needs of the facility 70. But if it can provide a significant percentage of the total demand, even just 10% to 30% of the total demand, this could translate into a meaningful investment with an attractive payback that therefore encourages mass adoption. There are relatively few moving parts if a simple heat exchanger is used—except for the water flowing through it, and the occasional opening/closing of the bypass valve 672 if the domestic water temperature ever gets too high or low.

The systems and methods described herein are particularly advantageous for new construction and existing buildings with water loops serving either water-to-water heat pumps or boiler/chiller/cooling tower combinations. And when combined with an air-source heat pump (e.g. the facility loop heat pump 660), these systems can approach the efficiency of a geothermal HVAC system without the high cost of a ground loop.

Figure 8:
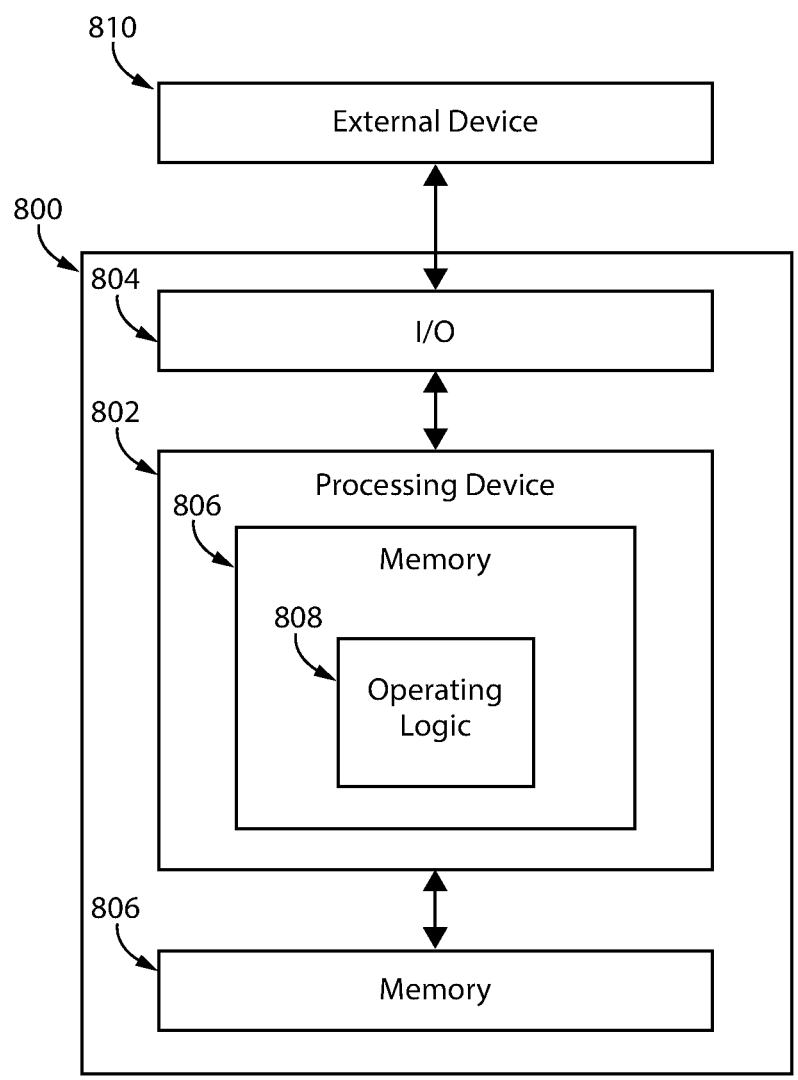
FIG. 8 is a schematic block diagram of a computing device that may be utilized in connection with certain embodiments.

Referring now to FIG. 8, a simplified block diagram of at least one embodiment of a computing device 800 is shown. The illustrative computing device 800 depicts at least one embodiment of a control system, controller, or external device that may be utilized in connection with the control systems 170, 270, 670 and external device 680 illustrated in FIGS. 1, 2, and 8.

Depending on the particular embodiment, the computing device 800 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 800 includes a processing device 802 that executes algorithms and/or processes data in accordance with operating logic 808, an input/output device 804 that enables communication between the computing device 800 and one or more external devices 810, and memory 806 which stores, for example, data received from the external device 810 via the input/output device 804.

The input/output device 804 allows the computing device 800 to communicate with the external device 810. For example, the input/output device 804 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 800. The input/output device 804 may include hardware, software, and/or firmware suitable for performing the techniques described herein.

The external device 810 may be any type of device that allows data to be inputted or outputted from the computing device 800. For example, in various embodiments, the external device 810 may be embodied as the facility loop 610, the water-source heat pump 620, the zone heat pump 630, the temperature sensor array 650, the facility loop heat pump 660, the controller 671, the bypass valve 672, the facility loop energy meter 674, the water energy meter 676, the local screen 678, or the external device 680. Further, in some embodiments, the external device 810 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 810 may be integrated into the computing device 800.

The processing device 802 may be embodied as any type of processor(s) capable of performing the functions described herein. In particular, the processing device 802 may be embodied as one or more single or multi-core processors, microcontrollers, or other processor or processing/controlling circuits. For example, in some embodiments, the processing device 802 may include or be embodied as an arithmetic logic unit (ALU), central processing unit (CPU), digital signal processor (DSP), and/or another suitable processor(s). The processing device 802 may be a programmable type, a dedicated hardwired state machine, or a combination thereof. Processing devices 802 with multiple processing units may utilize distributed, pipelined, and/or parallel processing in various embodiments. Further, the processing device 802 may be dedicated to performance of just the operations described herein, or may be utilized in one or more additional applications. In the illustrative embodiment, the processing device 802 is of a programmable variety that executes algorithms and/or processes data in accordance with operating logic 808 as defined by programming instructions (such as software or firmware) stored in memory 806. Additionally or alternatively, the operating logic 808 for processing device 802 may be at least partially defined by hardwired logic or other hardware. Further, the processing device 802 may include one or more components of any type suitable to process the signals received from input/output device 804 or from other components or devices and to provide desired output signals. Such components may include digital circuitry, analog circuitry, or a combination thereof.

The memory 806 may be of one or more types of non-transitory computer-readable media, such as a solid-state memory, electromagnetic memory, optical memory, or a combination thereof. Furthermore, the memory 806 may be volatile and/or nonvolatile and, in some embodiments, some or all of the memory 806 may be of a portable variety, such as a disk, tape, memory stick, cartridge, and/or other suitable portable memory. In operation, the memory 806 may store various data and software used during operation of the computing device 800 such as operating systems, applications, programs, libraries, and drivers. It should be appreciated that the memory 806 may store data that is manipulated by the operating logic 808 of processing device 802, such as, for example, data representative of signals received from and/or sent to the input/output device 804 in addition to or in lieu of storing programming instructions defining operating logic 808. As illustrated, the memory 806 may be included with the processing device 802 and/or coupled to the processing device 802 depending on the particular embodiment. For example, in some embodiments, the processing device 802, the memory 806, and/or other components of the computing device 800 may form a portion of a system-on-a-chip (SoC) and be incorporated on a single integrated circuit chip.

In some embodiments, various components of the computing device 800 (e.g., the processing device 802 and the memory 806) may be communicatively coupled via an input/output subsystem, which may be embodied as circuitry and/or components to facilitate input/output operations with the processing device 802, the memory 806, and other components of the computing device 800. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 800 may include other or additional components, such as those commonly found in a typical computing device (e.g., various input/output devices and/or other components), in other embodiments. It should be further appreciated that one or more of the components of the computing device 800 described herein may be distributed across multiple computing devices. In other words, the techniques described herein may be employed by a computing system that includes one or more computing devices. Additionally, although only a single processing device 802, I/O device 804, and memory 806 are illustratively shown in FIG. 8, it should be appreciated that a particular computing device 800 may include multiple processing devices 802, I/O devices 804, and/or memories 806 in other embodiments. Further, in some embodiments, more than one external device 810 may be in communication with the computing device 800.

Certain embodiments of the present application relate to a method, comprising: placing a first heat exchanger in thermal communication with a water stream of a facility, the water stream leading to a point of water use, wherein the first heat exchanger is placed in thermal communication with the water stream upstream of the point of water use; placing the first heat exchanger in thermal communication with an indoor medium stream of the facility, the indoor medium stream leading to a point of indoor medium use wherein the first heat exchanger is placed in thermal communication with the indoor medium stream upstream of the point of indoor medium use; transferring thermal energy between the water stream and the indoor medium stream, thereby conditioning water of the water stream and conditioning indoor medium of the indoor medium stream; directing conditioned water to the point of water use; and directing conditioned indoor medium to the point of indoor medium use.

In certain embodiments, the indoor medium comprises air, and wherein the point of indoor medium use comprises a heating/cooling zone of the facility.

In certain embodiments, placing the first heat exchanger in thermal communication with the indoor medium stream comprises: placing the first heat exchanger in thermal communication with a facility loop refrigerant flowing within a facility loop of the facility; wherein the facility loop refrigerant is in thermal communication with the indoor medium such that the first heat exchanger is in thermal communication with the indoor medium via the facility loop refrigerant.

In certain embodiments, the facility further comprises a zone heat pump operable to transfer thermal energy between the facility loop refrigerant and the indoor medium such that the facility loop refrigerant is in thermal communication with the indoor medium via the zone heat pump.

In certain embodiments, placing the first heat exchanger in thermal communication with the indoor medium stream comprises: installing a water-source heat pump (WSHP) to the facility, the water-source heat pump comprising a WSHP vapor-compression loop having a WSHP refrigerant flowing therethrough, the WHSP vapor-compression loop comprising the first heat exchanger, a second heat exchanger, a WSHP compressor, and a WSHP expander; wherein installing the water-source heat pump to the facility comprises placing the second heat exchanger in thermal communication with the indoor medium such that the first heat exchanger is in thermal communication with the indoor medium via the WSHP refrigerant and the second heat exchanger.

In certain embodiments, placing the second heat exchanger in thermal communication with the indoor medium comprises: placing the second heat exchanger in thermal communication with a facility loop refrigerant flowing within a facility loop of the facility; wherein the facility loop refrigerant is in thermal communication with the indoor medium such that the second heat exchanger is in thermal communication with the indoor medium via the facility loop refrigerant.

In certain embodiments, the facility further comprises a zone heat pump operable to transfer thermal energy between the facility loop refrigerant and the indoor medium such that the facility loop refrigerant is in thermal communication with the indoor medium via the zone heat pump.

In certain embodiments, the indoor medium stream comprises a facility loop, and wherein the indoor medium comprises a facility loop refrigerant.

In certain embodiments, the method further comprises operating a zone heat pump to transfer thermal energy between the facility loop refrigerant and a second indoor medium.

In certain embodiments, the method further comprises selectively operating a bypass valve such that at least some of the facility loop refrigerant bypasses the first heat exchanger.

In certain embodiments, selectively operating the bypass valve comprises operating the bypass valve based upon a temperature of the conditioned water.

In certain embodiments, the method further comprises: monitoring a flowrate of the indoor medium across the first heat exchanger; sensing a temperature difference of the indoor medium across the first heat exchanger; determining a thermal energy transfer rate based upon the flowrate and the temperature difference; and displaying information relating to the thermal energy transfer rate to a user.

In certain embodiments, the method further comprises: monitoring a flowrate of the water across the first heat exchanger; sensing a temperature difference of the water across the first heat exchanger; determining a thermal energy transfer rate based upon the flowrate and the temperature difference; and displaying information relating to the thermal energy transfer rate to a user.

Certain embodiments of the present application relate to a method, comprising: operating a facility loop having a facility loop refrigerant flowing therethrough; selectively operating a first water-source heat pump to transfer thermal energy from a water cooling tank to the facility loop refrigerant, thereby heating the facility loop refrigerant while cooling water within the water cooling tank; selectively operating a second water-source heat pump to transfer thermal energy from the facility loop refrigerant to a water heating tank, thereby cooling the facility loop refrigerant while heating water within the water heating tank; operating a first additional heat pump to transfer thermal energy between the facility loop refrigerant and an indoor medium; directing water from the water cooling tank to a point of cold water use; and directing water from the water heating tank to a point of hot water use.

In certain embodiments, the facility loop refrigerant comprises water.

In certain embodiments, selectively operating the first water-source heat pump comprises operating the first water heat pump based upon a temperature of the facility loop refrigerant.

In certain embodiments, selectively operating the second water-source heat pump comprises operating the second water heat pump based upon a temperature of the facility loop refrigerant.

Certain embodiments of the present application relate to a system for a facility comprising a first heating/cooling zone and a water delivery system configured to deliver domestic water to a point of water use, the system comprising: a facility loop having a facility loop refrigerant flowing therethrough; a first zone heat pump configured to transfer thermal energy between the facility loop refrigerant and the first heating/cooling zone; and a first water-source heat pump configured to transfer thermal energy between domestic water upstream of the point of water use and the facility loop refrigerant.

In certain embodiments, the first water-source heat pump has a first heat pump refrigerant flowing therethrough and comprises: a first heat exchanger configured to exchange thermal energy between a first heat pump refrigerant and the facility loop refrigerant; a second heat exchanger configured to exchange thermal energy between the first heat pump refrigerant and water flowing within the water delivery system, wherein the second heat exchanger is positioned upstream of the point of water use; a first compressor configured to compress the first heat pump refrigerant; and a first expander configured to expand the first heat pump refrigerant; wherein a first vapor-compression loop comprises the first heat exchanger, the second heat exchanger, the first compressor, and the first expander, the first vapor-compression loop having the first heat pump refrigerant flowing therethrough.

In certain embodiments, the point of water use comprises a point of cold water use; wherein the system further comprises a water cooling tank positioned upstream of the point of cold water use; and wherein the first water-source heat pump is configured to transfer thermal energy to the facility loop refrigerant from domestic water within the water heating tank.

In certain embodiments, the point of water use comprises a point of hot water use; wherein the system further comprises a water heating tank positioned upstream of the point of hot water use; and wherein the first water-source heat pump is configured to transfer thermal energy from the facility loop refrigerant to domestic water within the water heating tank.

In certain embodiments, the facility further comprises a point of cold water use, and wherein the system further comprises: a water cooling tank positioned upstream of the point of cold water use; and a second water-source heat pump configured to transfer thermal energy from domestic water within the water cooling tank to the facility loop refrigerant.

In certain embodiments, the facility further comprises a second heating/cooling zone, and wherein the system further comprises a second zone heat pump configured to transfer thermal energy between the facility loop refrigerant and the second heating/cooling zone.

Certain embodiments of the present application relate to a method, comprising: operating a facility loop having a facility loop refrigerant flowing therethrough, wherein the facility loop is installed to a facility having a first heating/cooling zone; operating a zone heat pump to transfer thermal energy between the facility loop refrigerant and the first heating/cooling zone; transferring thermal energy between the facility loop refrigerant and a domestic water stream via a first heat exchanger in thermal communication with the domestic water stream and the facility loop refrigerant, thereby converting source water upstream of the first heat exchanger to conditioned water downstream of the first heat exchanger; and directing the conditioned water downstream of the first heat exchanger to a point of domestic water use.

In certain embodiments, the first heat exchanger is in direct thermal communication with the building loop refrigerant and direct thermal communication with the domestic water stream.

In certain embodiments, the first heat exchanger is a double-walled heat exchanger.

In certain embodiments, transferring thermal energy between the facility loop refrigerant and the domestic water stream comprises operating a water-source heat pump comprising the first heat exchanger to transfer thermal energy between the facility loop refrigerant; and wherein the water-source heat pump further comprises: a second heat exchanger in thermal communication with the building loop refrigerant; and a water-source heat pump refrigerant flowing through the first heat exchanger and the second heat exchanger such that the first heat exchanger is in indirect thermal communication with the building loop refrigerant.

Certain embodiments of the present application relate to a method, comprising: installing a first heat pump to a facility comprising a water stream leading to a point of water use and an indoor medium stream leading to a point of indoor medium use, wherein installing the first heat pump comprises: placing a first heat exchanger of the first heat pump in thermal communication with the water stream upstream of the point of water use such that the first heat exchanger is operable to transfer thermal energy between a first refrigerant of the first heat pump and the water prior to use of the water at the point of water use; and placing a second heat exchanger of the first heat pump in thermal communication with the indoor medium stream upstream of the point of indoor medium use such that the second heat exchanger is operable to transfer thermal energy between the first refrigerant and the indoor medium prior to use of the indoor medium at the point of indoor medium use; wherein the first heat pump comprises a first vapor-compression loop comprising a compressor, an expander, the first heat exchanger, and the second heat exchanger, the first vapor-compression loop having the first refrigerant flowing therethrough; operating the first heat pump to transfer thermal energy between the indoor medium and the water, thereby converting source water upstream of the first heat exchanger to conditioned water downstream of the first heat exchanger and converting source indoor medium upstream of the second heat exchanger to conditioned indoor medium downstream of the second heat exchanger; directing the conditioned water to the point of water use; and directing the conditioned indoor medium to the point of indoor medium use.

In certain embodiments, the first vapor compression loop is a reversible vapor compression loop.

In certain embodiments, operating the first heat pump to transfer thermal energy between the indoor medium and the water comprises operating the first heat pump in a medium-cooling mode in which thermal energy is transferred from the indoor medium to the first refrigerant such that the conditioned indoor medium is cooler than the source indoor medium, and thermal energy is transferred from the first refrigerant to the water such that the conditioned water is warmer than the source water.

In certain embodiments, operating the first heat pump to transfer thermal energy between the indoor medium and the water comprises operating the first heat pump in a medium-heating mode in which thermal energy is transferred to the indoor medium from the first refrigerant such that the conditioned indoor medium is warmer than the source indoor medium, and thermal energy is transferred to the first refrigerant from the water such that the conditioned water is cooler than the source water.

In certain embodiments, the indoor medium comprises air, wherein the point of indoor medium use comprises an indoor zone, and wherein directing the conditioned indoor medium to the point of indoor medium use comprises directing the conditioned air to the indoor zone.

In certain embodiments, the indoor medium comprises a second refrigerant, wherein the point of indoor medium use comprises a third heat exchanger.

In certain embodiments, the method further comprises installing a second heat pump to the facility, wherein installing the second heat pump comprises forming a second vapor compression loop comprising the second heat exchanger, the third heat exchanger, a second compressor, and a second expander; wherein the second heat exchanger transfers thermal energy between the first refrigerant and the second refrigerant; and wherein the third heat exchanger transfers thermal energy between the second refrigerant and a second indoor medium.

In certain embodiments, the method further comprises directing the second indoor medium to a second point of indoor medium use.

In certain embodiments, the second indoor medium comprises air, wherein the second point of indoor medium use comprises an indoor zone, and wherein directing the second indoor medium to the second point of indoor medium use comprises directing air to the indoor zone subsequent to the air being heated or cooled by the third heat exchanger.

In certain embodiments, the method further comprises: installing a building loop to the facility, wherein the indoor medium comprises a building loop refrigerant that flows through the building loop; installing a second heat pump to the facility such that the second heat pump is operable to transfer thermal energy between the building loop refrigerant and a second indoor medium.

In certain embodiments, installing the second heat pump comprises: placing a third heat exchanger in thermal communication with the building loop refrigerant such that the third heat exchanger is operable to transfer thermal energy between the building loop refrigerant and a second refrigerant of the second heat pump, thereby providing the third heat exchanger as the point of indoor medium use; placing a fourth heat exchanger in thermal communication with the second indoor medium such that the second heat exchanger is operable to transfer thermal energy between the second refrigerant and the second indoor medium; and connecting a second compressor and a second expander with the third heat exchanger and the fourth heat exchanger such that the third heat exchanger, the fourth heat exchanger, the second compressor, and the second expander form a second vapor compression loop having the second refrigerant flowing therethrough.

In certain embodiments, the method further comprises installing a water tank to the facility, wherein the water tank comprises the first heat exchanger.

In certain embodiments, the method further comprises: installing a building loop to the facility, wherein the indoor medium comprises a building loop refrigerant that flows through the building loop; installing a first water tank to the facility, wherein the first water tank comprises the first heat exchanger; and installing a second heat pump to the facility such that the second heat pump is operable to transfer thermal energy between the building loop refrigerant and a second indoor medium.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
operating a facility loop having a facility loop refrigerant flowing therethrough;
selectively operating a first water-source heat pump to transfer thermal energy from a water cooling tank to the facility loop refrigerant, thereby heating the facility loop refrigerant while cooling water within the water cooling tank;

selectively operating a second water-source heat pump to transfer thermal energy from the facility loop refrigerant to a water heating tank, thereby cooling the facility loop refrigerant while heating water within the water heating tank;

operating a first additional heat pump to transfer thermal energy between the facility loop refrigerant and an indoor medium;

directing water from the water cooling tank to a point of cold water use; and directing water from the water heating tank to a point of hot water use.

2. The method of claim 1, wherein the facility loop refrigerant comprises water.

3. The method of claim 1, wherein selectively operating the first water-source heat pump comprises operating the first water heat pump based upon a temperature of the facility loop refrigerant.

4. The method of claim 1, wherein selectively operating the second water-source heat pump comprises operating the second water heat pump based upon a temperature of the facility loop refrigerant.

5. A system, comprising:

a facility loop having a facility loop refrigerant flowing therethrough, wherein the facility loop is installed to a facility having a first heating/cooling zone;

a zone heat pump configured to transfer thermal energy between the facility loop refrigerant and the first heating/cooling zone; and a first heat exchanger in thermal communication with a domestic water stream and the facility loop refrigerant, wherein the first heat exchanger is configured to transfer thermal energy between the facility loop refrigerant and the domestic water stream, thereby converting source water upstream of the first heat exchanger to conditioned water downstream of the first heat exchanger;

wherein the conditioned water downstream of the first heat exchanger is directed to a point of domestic water use.

6. The system of claim 5, wherein the first heat exchanger is in direct thermal communication with the facility loop refrigerant and direct thermal communication with the domestic water stream.

7. The system of claim 6, wherein the first heat exchanger is a double-walled heat exchanger.

8. The system of claim 5, further comprising a water-source heat pump including the first heat exchanger; and wherein the water-source heat pump further comprises:

a second heat exchanger in thermal communication with the facility loop refrigerant; and a water-source heat pump refrigerant flowing through the first heat exchanger and the second heat exchanger such that the first heat exchanger is in indirect thermal communication with the facility loop refrigerant.

\* \* \* \* \*